United States Patent
Fukuda et al.

(10) Patent No.: US 10,916,986 B2
(45) Date of Patent: Feb. 9, 2021

(54) STATOR AND ROTATING ELECTRIC MACHINE EQUIPPED WITH SAME

(71) Applicant: Hitachi Automotive Systems, Ltd., Hitachinaka (JP)

(72) Inventors: Tomohiro Fukuda, Hitachinaka (JP); Kenichi Nakayama, Hitachinaka (JP); Shinji Yamazaki, Hitachinaka (JP); Hisaya Shimizu, Hitachinaka (JP)

(73) Assignee: Hitachi Automotive Systems, Ltd., Hitachinaka (JP)

(*) Notice: Subject to any disclaimer, the term of this patent is extended or adjusted under 35 U.S.C. 154(b) by 656 days.

(21) Appl. No.: 15/033,668

(22) PCT Filed: Oct. 20, 2014

(86) PCT No.: PCT/JP2014/077769
§ 371 (c)(1),
(2) Date: May 2, 2016

(87) PCT Pub. No.: WO2015/072285
PCT Pub. Date: May 21, 2015

(65) Prior Publication Data
US 2016/0276890 A1    Sep. 22, 2016

(30) Foreign Application Priority Data

Nov. 12, 2013    (JP) .................................. 2013-233611

(51) Int. Cl.
*H02K 3/28* (2006.01)
*H02K 3/50* (2006.01)
(Continued)

(52) U.S. Cl.
CPC ................. *H02K 3/28* (2013.01); *H02K 1/16* (2013.01); *H02K 3/12* (2013.01); *H02K 3/50* (2013.01);
(Continued)

(58) Field of Classification Search
CPC .. H02K 3/28; H02K 1/16; H02K 3/12; H02K 3/50; H02K 19/10; H02K 15/0081; H02K 3/46
(Continued)

(56) References Cited

U.S. PATENT DOCUMENTS 4,087,713 A * 5/1978 Binder ..................... H02K 3/46
310/263
6,288,462 B1    9/2001 Tanaka et al.
(Continued)

FOREIGN PATENT DOCUMENTS

EP    2 273 654 A2    1/2011
EP    2 369 722 A2    9/2011
(Continued)

OTHER PUBLICATIONS

Omori (JP 2009183070 A) English Translation (Year: 2009).*
(Continued)

*Primary Examiner* — Tulsidas C Patel
*Assistant Examiner* — Robert E Mates
(74) *Attorney, Agent, or Firm* — Crowell & Moring LLP

(57) ABSTRACT

A stator in which the height of a coil end of a stator winding can be lowered is provided, and an electric rotating machine including such a stator is provided. In a stator of an electric rotating machine including a stator winding including neutral lines and output lines, the neutral lines are configured to include crawling portion extending circumferentially in the upper portion of a coil at the coil end, and the crawling portion includes an axial stepped portion. The output lines are configured to pass under the axial stepped portion in at least one location of three phases.

8 Claims, 6 Drawing Sheets

(51) Int. Cl.
*H02K 3/12* (2006.01)
*H02K 1/16* (2006.01)
*H02K 19/10* (2006.01)
*H02K 15/00* (2006.01)

(52) U.S. Cl.
CPC ......... *H02K 19/10* (2013.01); *H02K 15/0081* (2013.01)

(58) Field of Classification Search
USPC ..................... 310/179, 201, 206, 207, 210
See application file for complete search history.

(56) References Cited

U.S. PATENT DOCUMENTS

| | | | |
|---|---|---|---|
| 2003/0218394 A1* | 11/2003 | Hashiba | H02K 3/12 310/71 |
| 2009/0140596 A1 | 6/2009 | Kaiser et al. | |
| 2010/0141078 A1 | 6/2010 | Kouda et al. | |
| 2011/0001373 A1 | 1/2011 | Mori et al. | |
| 2012/0237372 A1 | 9/2012 | Fukasaku et al. | |
| 2013/0076170 A1* | 3/2013 | Adra | H02K 3/24 310/59 |
| 2014/0184011 A1 | 7/2014 | Kaimori et al. | |

FOREIGN PATENT DOCUMENTS

| | | | |
|---|---|---|---|
| JP | 2001-231205 A | 8/2001 | |
| JP | 2007-259577 A | 10/2007 | |
| JP | 2009-112186 A | 5/2009 | |
| JP | 2009-183070 A | 8/2009 | |
| JP | 2009183070 A * | 8/2009 | ............... H02K 3/50 |
| JP | 2011-15459 A | 1/2011 | |
| JP | 2013-59156 A | 3/2013 | |

OTHER PUBLICATIONS

International Search Report (PCT/ISA/210) issued in PCT Application No. PCT/JP2014/077769 dated Jan. 27, 2015 with English translation (6 pages).
Japanese-language Written Opinion (PCT/ISA/237) issued in PCT Application No. PCT/JP2014/077769 dated Jan. 27, 2015 (5 pages).
Extended European Search Report issued in counterpart European Application No. 14861800.2 dated Jun. 6, 2017 (eight (8) pages).
Japanese-language Office Action issued in counterpart Japanese Application No. 2015-547704 dated Dec. 6, 2016 with English translation (Ten (10) pages).
European Communication pursuant to Article 94(3) EPC issued in counterpart European Application No. 14861800.2 dated Jul. 19, 2019 (six (6) pages).

* cited by examiner

STATOR AND ROTATING ELECTRIC MACHINE EQUIPPED WITH SAME

TECHNICAL FIELD

The present invention relates to a stator and an electric rotating machine including a stator.

BACKGROUND ART

Background art of this technical field includes JP 2007-259577 A (PTL 1). The publication discloses, as a method of solving a problem of providing an electric rotating machine in which the height of the coil end of a stator winding can be lowered, "An electric rotating machine including a rotor and a stator disposed opposite to and at radially outside of the rotor. The stator includes a stator core including a plurality of slots arranged circumferentially, and a stator winding provided as a multi-phase winding formed of a plurality of coils by joining segment conductors. Part of the winding is disposed in a slot, and one of the rest of the winding projects from the axial end face of the stator core. Linear portions of an even number of at least six segment conductors are disposed in the slot. A rear pitch is an interval among sides of the coils on the no-joining side of the coils. The rear pitch includes both a pitch larger than a magnetic pole pitch and a pitch smaller than the magnetic pole pitch. A turn portion of the segment conductor, which has the rear pitch larger than the magnetic pole pitch, is disposed at a position covering the turn portion of the segment conductor having a rear pitch smaller than the magnetic pole pitch (see Abstract)."

CITATION LIST

Patent Literature

PTL 1: JP 2007-259577 A

SUMMARY OF INVENTION

Technical Problem

PTL 1 discloses an electric rotating machine in which the height of the coil end is lowered. In the electric rotating machine of PTL 1, however, connection portions of neutral lines are extended axially and then welded.

Such an electric rotating machine cannot avoid an increase of height of the welding portion of coils, and it may be difficult to achieve a low coil end.

The present invention provides a stator in which the height of the coil end of the stator winding can be lowered, and also relates to an electric rotating machine including such a stator.

Solution to Problem

To solve the above problem, the structure recited in the appended claims, for example, will be adopted. The present application includes multiple means to solve the above problem. In one example, a stator of an electric rotating machine includes a stator winding having neutral lines and output lines. The neutral lines include a crawling portion that extends circumferentially at the upper portions of coils at the coil end. The crawling portion has an axial stepped portion.

Advantageous Effects of Invention

According to the present invention, a stator in which the height of the coil end of the stator winding can be lowered, and an electric rotating machine including such a stator can be provided.

Other problems, structures, and effects that are not described above will be apparent from the following description of the embodiment.

DESCRIPTION OF EMBODIMENTS

An embodiment of the present invention will be described below by referring to the accompanying drawings.

An embodiment described herein relates to a crawling structure of neutral lines and output lines of a stator of an electric rotating machine. The electric rotating machine mainly includes a cylindrical stator and a rotor disposed on the inner diameter side of the stator at a predetermined distance from the stator. The stator has a plurality of magnetic poles arranged such that the polarity alternates in a rotational direction, and includes a cylindrical stator core, and a plurality of stator windings wound around the stator core. The stator core includes a plurality of slots that are formed in an axially penetrating manner and arranged circumferentially. Each stator winding is formed by electrically connecting lots of conductors disposed in each slot. The winding extends axially in the slot, while a lead-out line portion led out from one axial end of the slot extends over multiple slots arranged at predetermined circumferential pitches to correspond to the plurality of magnetic poles. Each stator winding includes an output line portion and a neutral line portion for external connection at both ends of the stator winding. The stator windings (coils) have multiple phases and are connected by, for example, 2Y-connection in the neutral line portion.

In the present embodiment, an axial stepped portion is provided in the crawling portion of the neutral line of the multiple-phased stator winding extending circumferentially. At least one phase of the output line is made to slip into a space generated above the stepped portion and the no-connection portions of U-shaped or V-shaped segment coils. As a result, a low coil end can be achieved and a gap is secured from other devices, such as a mission portion.

An embodiment of the present invention will be described below by referring to FIGS. 1 to 8.

Figure 1:
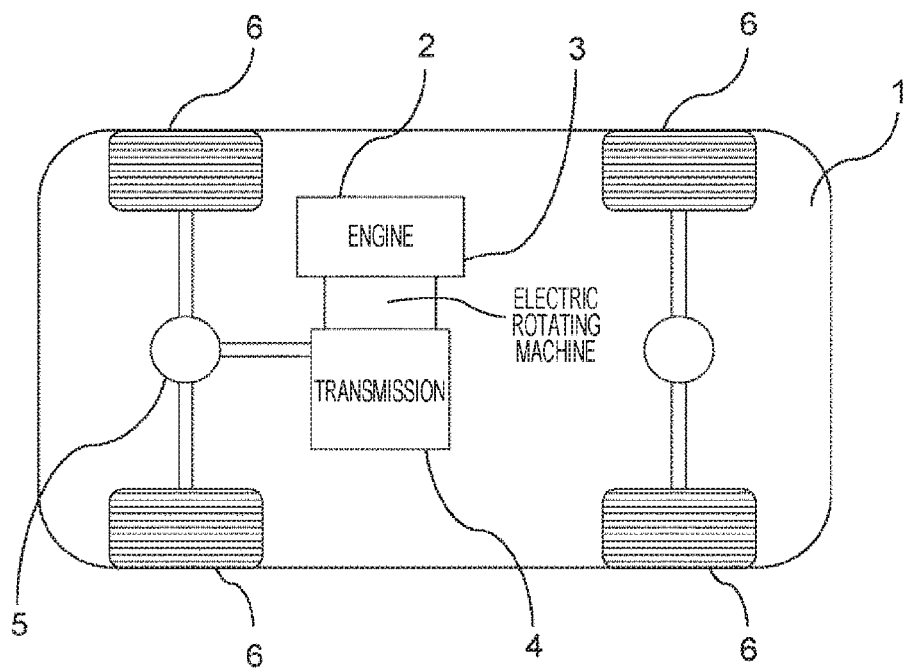
FIG. 1 is a block diagram of a hybrid electric vehicle.

FIG. 1 is a block diagram of a hybrid electric vehicle with an electric rotating machine according to an embodiment of the present invention installed therein. A vehicle 1 includes an engine 2 and an electric rotating machine 3 used as a power source f r the vehicle. Alternatively, two electric rotating machines having different functions may be used. In such a case, one electric rotating machine performs both a power generating function and a vehicle driving function, while the other electric rotating machine may be responsible for driving of the vehicle.

A rotating torque generated by the engine 2 and the electric rotating machine 3 is transmitted to wheels (driving wheels) 6 via a transmission 4, such as a stepless transmission or a stepped automatic transmission, and a differential gear 5. The electric rotating machine 3 is installed between the engine 2 and the transmission 4, or in the transmission 4. Thus, the electric rotating machine 3 minimizes the influence of space on the vehicle 1, such that a small size and a high output are required.

Figure 2:
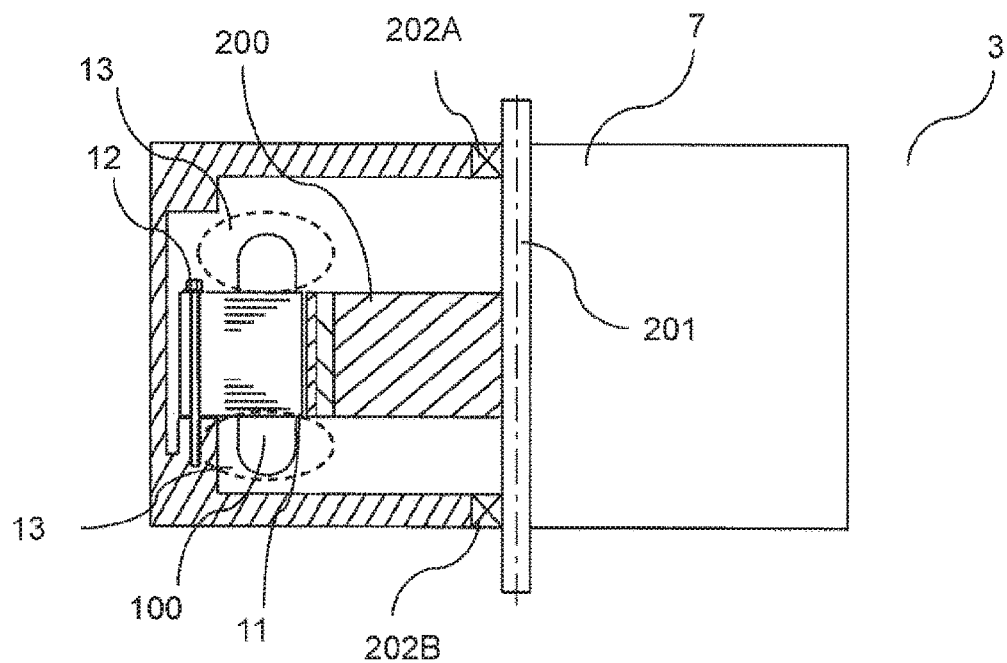
FIG. 2 is a cross-sectional view of an electric rotating machine according to an embodiment of the present invention.

FIG. 2 is a partial cross-sectional view schematically illustrating the electric rotating machine 3, in which the right part from a shaft 201 is illustrated as a cross-sectional view and the left part is illustrated as a side view. The electric rotating machine 3 is disposed inside of a case 7. When the electric rotating machine 3 is disposed between an engine 2 and a transmission 4, as illustrated in FIG. 1, the case 7 is formed using the case of the engine 2 or the case of the transmission 4. When the electric rotating machine 3 is installed in the transmission 4, the case 7 is formed using the case of the transmission 4.

The electric rotating machine 3 includes, as well known in the art, a stator 100 and a rotor 200. The rotor 200 is disposed on the inner circumference side of the stator 100 via a gap 11. The rotor 200 is fixed to a shaft 201 and rotates unitarily with the shaft 201. Both ends of the shaft 201 are rotatably supported to a case 7 by bearings 202A, 202B. The outer circumference side of the stator 100 is fixed on the inner circumference side of the case 7 with bolts 12 or the like. The electric rotating machine 3 is a three-phase synchronous electric motor using a permanent magnet as the rotor 200, and functions as an electric motor when a large three-phase alternate current (e.g., about 300 A) is supplied to the stator 100.

Figure 3:
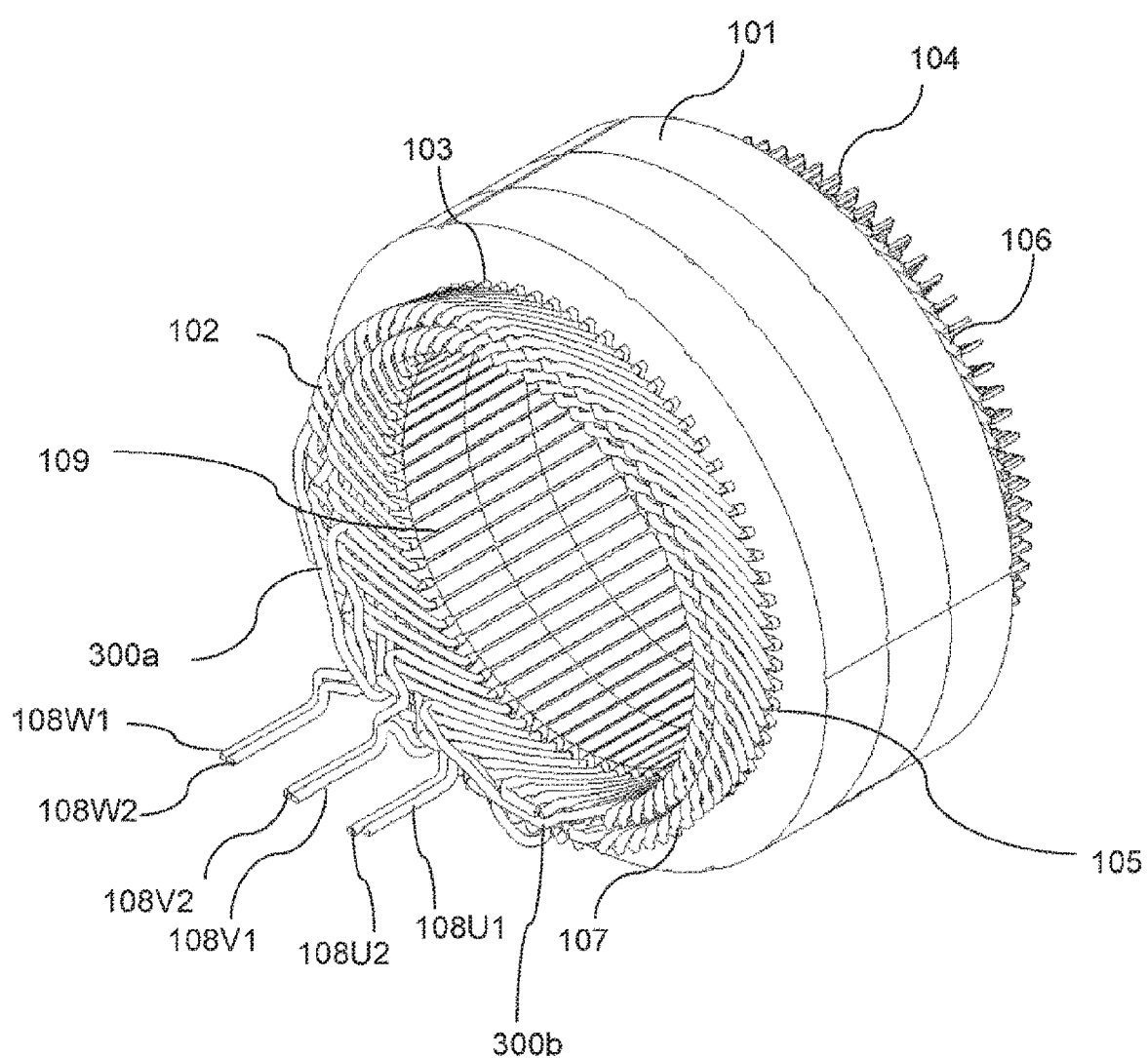
FIG. 3 is an external view of a stator of the electric rotating machine.
Figure 4:
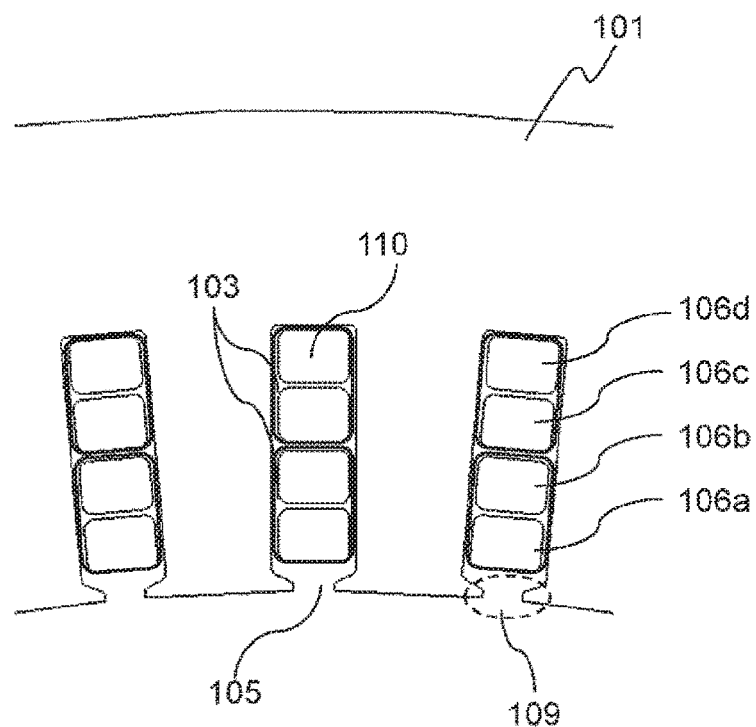
FIG. 4 is a schematic view of a winding disposed in a slot.

FIG. 3 is a perspective view illustrating the stator 100 alone of the electric rotating machine 1. FIG. 4 is a cross-sectional view corresponding to the inside of individual slots 105.

As illustrated in FIGS. 3 and 4, the stator 100 includes a stator core (also referred to as a stator iron core) 101 in which a plurality of slots 105 is formed on the inner diameter side of the stator, and three stator windings 102 wounded around the stator core 101, each winding corresponding to U-phase, V-phase, and W-phase, respectively. The slots 105 are formed penetratingly in an axial direction and is arranged at equal intervals from each other at a predetermined circumferential pitch in a circumferential direction. A slit 109 is opened to extend axially on the inner diameter side.

Each stator winding; 102 includes lots of conductors 106 that are inserted and held in the slots 105, as will be described later. The conductors 106, which are provided adjacent to each other in the same slot 105, are welded together at a welding portion 104 formed at one axial end side (lower end side of FIG. 3) of the stator core 101. Thus, a longitudinal stator winding 102 in which the conductors 106 are electrically connected with each other at the welding portion 104 is formed. Insulating paper 103 is inserted in each slot 105 to insulate between a linear portion 110 that penetrates through the slot 105 of the conductor 106 and the stator core 101. As illustrated in FIG. 4, the insulating paper 103 is provided to bundle two adjacent conductors 106 of four conductors 106 arranged in each slot 105. That is, two pieces of insulating paper 103 are provided in each slot 105.

Each stator winding 102 extends across more than one slots 105 arranged apart from each other at predetermined circumferential pitches by an approximately U-shaped or V-shaped lead-out line portion 107 that is led out from one axial end of the slot 105. The stator windings 102 generate a plurality of magnetic poles whose polarity is arranged to alternate in the rotating direction.

As illustrated in FIG. 4, four conductors 106a, 106b, 106c, and 106d inserted in the slot 105 are arranged radially in a row in the stator core 101 so as to form concentric layers. It is assumed that the conductors 106a, 106b, 106c, and 106d inserted in each slot 105 are regarded as a first layer, a second layer, a third layer, and a fourth layer, respectively, in this order from the inner diameter side. Specifically, the conductor portion 106a is disposed and inserted in the first layer, the conductor portion 106b is disposed and inserted in the second layer, the conductor portion 106c is disposed and inserted in the third layer, and the conductor portion. 106d is disposed and inserted in the fourth layer.

Figure 5:
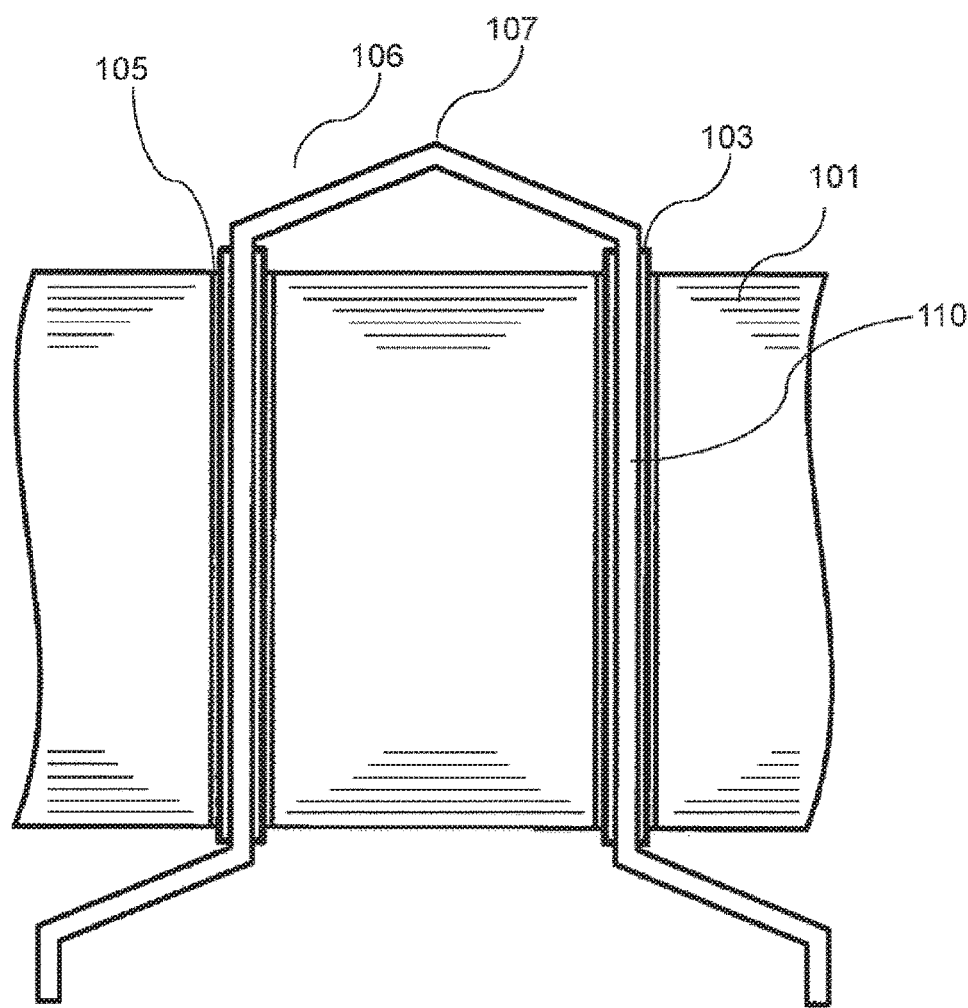
FIG. 5 illustrates a stator core with coils inserted therein when seen from an inner diameter side.

FIG. 5 illustrates the stator core with coils inserted therein when seen from the inner diameter side.

Each conductor 106 forming the stator winding 102 is a rectangular segment coil having a rectangular cross-section, as is also illustrated in FIGS. 4 and 5. The conductors 106 are shaped substantially similarly, except for the conductors 106 provided at both ends of the stator winding 102 where neutral line portions and output line portions are provided. Each conductor 106 has the linear portion 110 axially penetrating through the slot 105, while one lead-out line portion 107 led out from one axial end (left side of FIG. 3) of the slot 105 is in the U-shape or the V-shape, and made of a copper wire having joint portions 104 on both ends.

Alternatively, segment coils may be used. In this case, coil ends, which are located on both axial ends from the ends of the stator core 101, can be formed previously before the segment coil is inserted into the slot 104 to provide an insulating distance appropriate for different phases or the same phase can easily be provided.

The lead-out line portion 107 of the conductors 106 located at one end of the stator winding 102 includes an output line portion 108 (108U1, 108U2, 108V1, 108V2, 108W1, 108W2) for connecting to external devices, and a neutral line portion 300 to which end portions of each phase are connected. In the present embodiment, the neutral line portions 300a, 300b have a structural feature.

Figure 6:
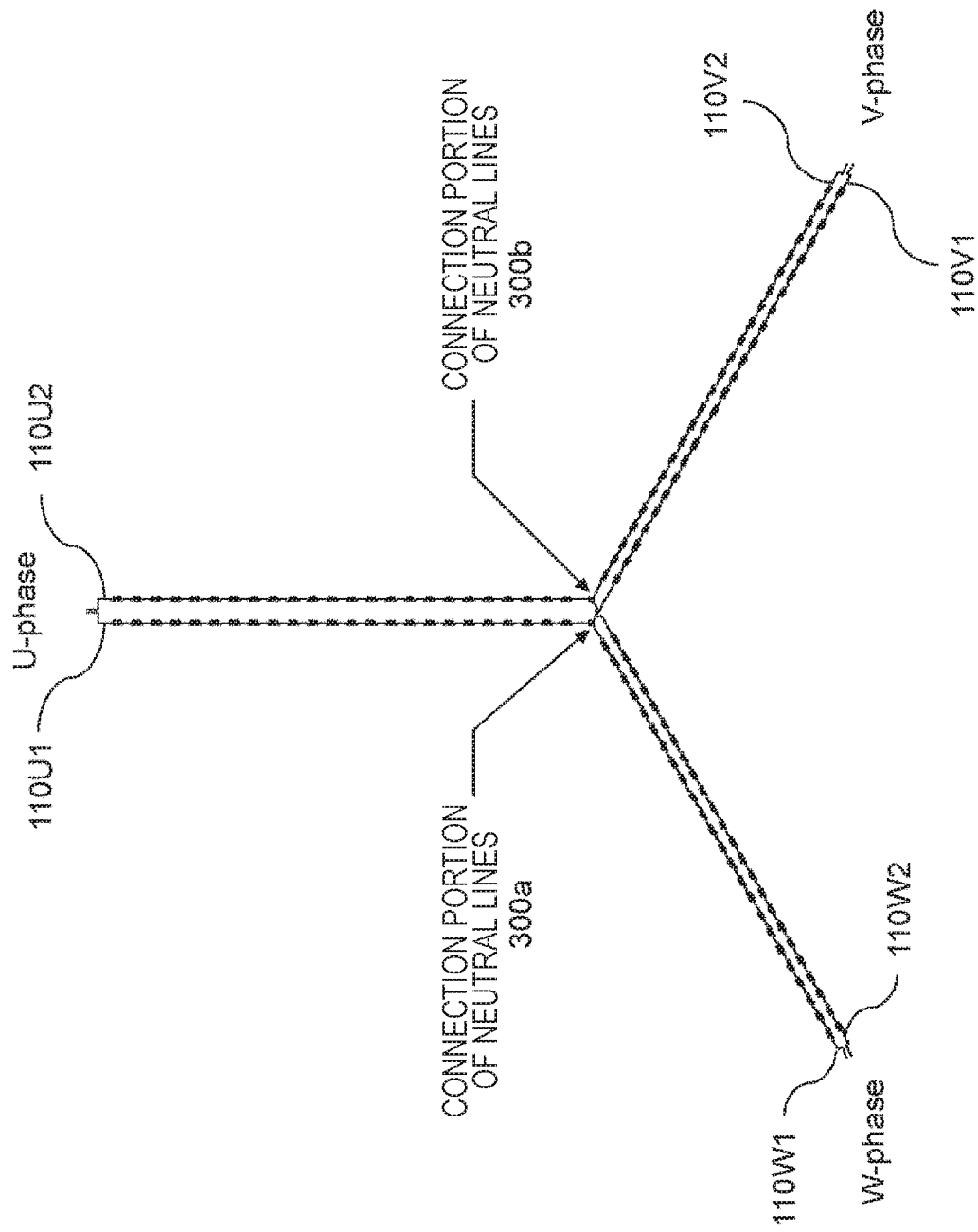
FIG. 6 illustrates a wire connection structure according to the embodiment of the present invention.

FIG. 6 illustrates a wire connection structure of the present embodiment. The windings are 2Y-connection windings in the present embodiment.

Figure 7:
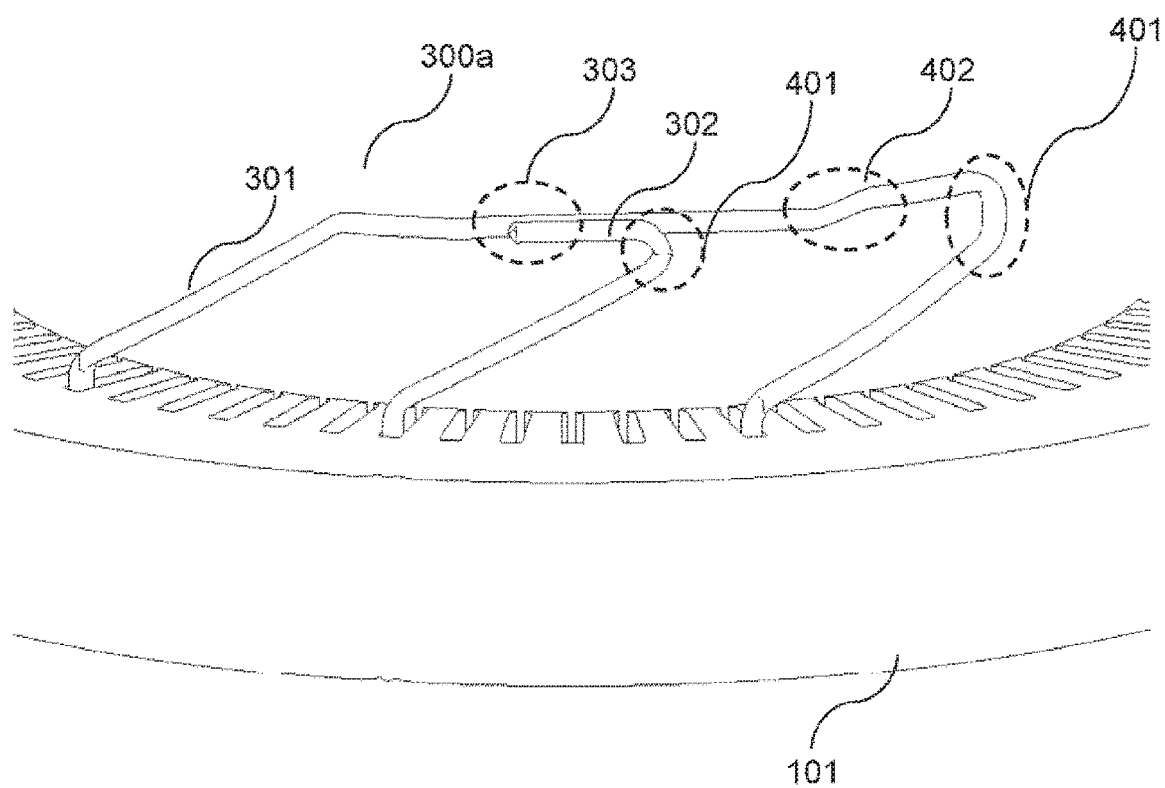
FIG. 7 is an explanatory view for explaining a neutral line structure.

FIG. 7 is an explanatory view for explaining a neutral line 300a. Neutral line portions 300a, 300b are similarly formed, except that one extends from a slot on the external diameter side and the other extends from the inner diameter side. In this embodiment, the neutral line portion 300a is described as an example. The winding forming the coil end 13 (see FIG. 2) is not illustrated. The neutral line 300a includes a neutral line 301 led out from the first and second slots, and a neutral line 302 led out from the third slot located at an intermediate pitch between the first and second slots. The conductors 301 and 302 have a feature that these conductors are led out from the same layer illustrated in FIG. 4. The conductor 301 includes a neutral line of the U-phase winding and a neutral line of the W-phase winding, and is formed by a continuous rectangular conductor. These neutral lines are connected to a neutral line 302 of the V-phase winding. The neutral line 301 has an acute-angle axially-folded and bent portion 401, and an axially-bent stepped portion 402 in the vicinity of the acute-angle axially-folded and bent portion. The first to third slots for the neutral lines 301 and 302 are arranged at equal pitches. Connection portions 303 are connected to extend radially to the stator core 101 in order to restrict the height of the coil end.

By referring to FIGS. 3 and 7, an inclined line portion 111 is formed at the lead-out line portion 107 of all conductors 106 at a portion led out from one axial end of the slot 105. The inclined line portion 111 extends circumferentially and is inclined in a predetermined direction from the linear portion 110 penetrating through the slot 105. Another inclined line portion is provided at the lead-out line portion 107 of the normal conductor 106 that does not include a neutral line portion 300a. The inclined line portion is inclined at an obtuse angle from the inclined line portion 111 and is formed in a U-shape or a V-shape.

In contrast, the neutral line 300a has an acute-angle folded portion 401 that turns by more than 90 degrees in the lead-out direction of the inclined line portion 111. Specifically, a folded line portion 402 folded at the folded portion 401 is provided circumferentially in an approximately reverse direction from the inclined line portion 111.

In particular, the acute angle portion 401 is formed in parallel with a plane perpendicular to the axial direction of the stator 100 and along the circumferential direction similarly to the coil end group. Thus, a projecting region including the output line portion and the neutral line portion, both projecting from the coil end portion, is decreased.

The neutral line portion 300 also includes a plurality of bent portions that include the axially-bent stepped portion 402 in addition to the acute-angle portion 401 described above. Forming the plurality of bent portions leads to improvement of its rigidity to suppress vibration, and improvement of durability and reliability.

The neutral line portions 300a, 300b, which are not illustrated, are covered by an insulating epoxy-based coating film, such as an epoxy resin. Covering the neutral line portions 300a, 300b with the insulating coating film leads to easily ensuring the insulating characteristic without impairing the cooling characteristic of the conductors.

In the present embodiment, connection portions 303 of the neutral lines 301, 302 are connected without removing the insulating coating film, but the insulating coating film may be peeled off to facilitate the connection. For example, only a certain area of the connection portions may be peeled off using a mold or by laser, or the insulating coating film may be carbonized by fusing, followed by application of pressure, to thereby indirectly remove the insulating coating film.

The connection portions 302 of the neutral lines 301 and 302 may also be joined and integrated by, for example, brazing, TIG welding, or ultrasonic welding.

It does not matter whether the neutral lines 301, 302 are connected before or after the insertion of the neutral lines into the slot 105 of the stator core 101.

Since the 2Y-connection is adopted in the present embodiment, the neutral lines 300 are arranged in the innermost row, as well as the outermost row of the slot, when seen from the radial direction of the stator core 101. In the case of the 1Y-connection or the delta connection, however, the neutral lines 300 may be disposed only in the outermost row or the innermost row.

Figure 8:
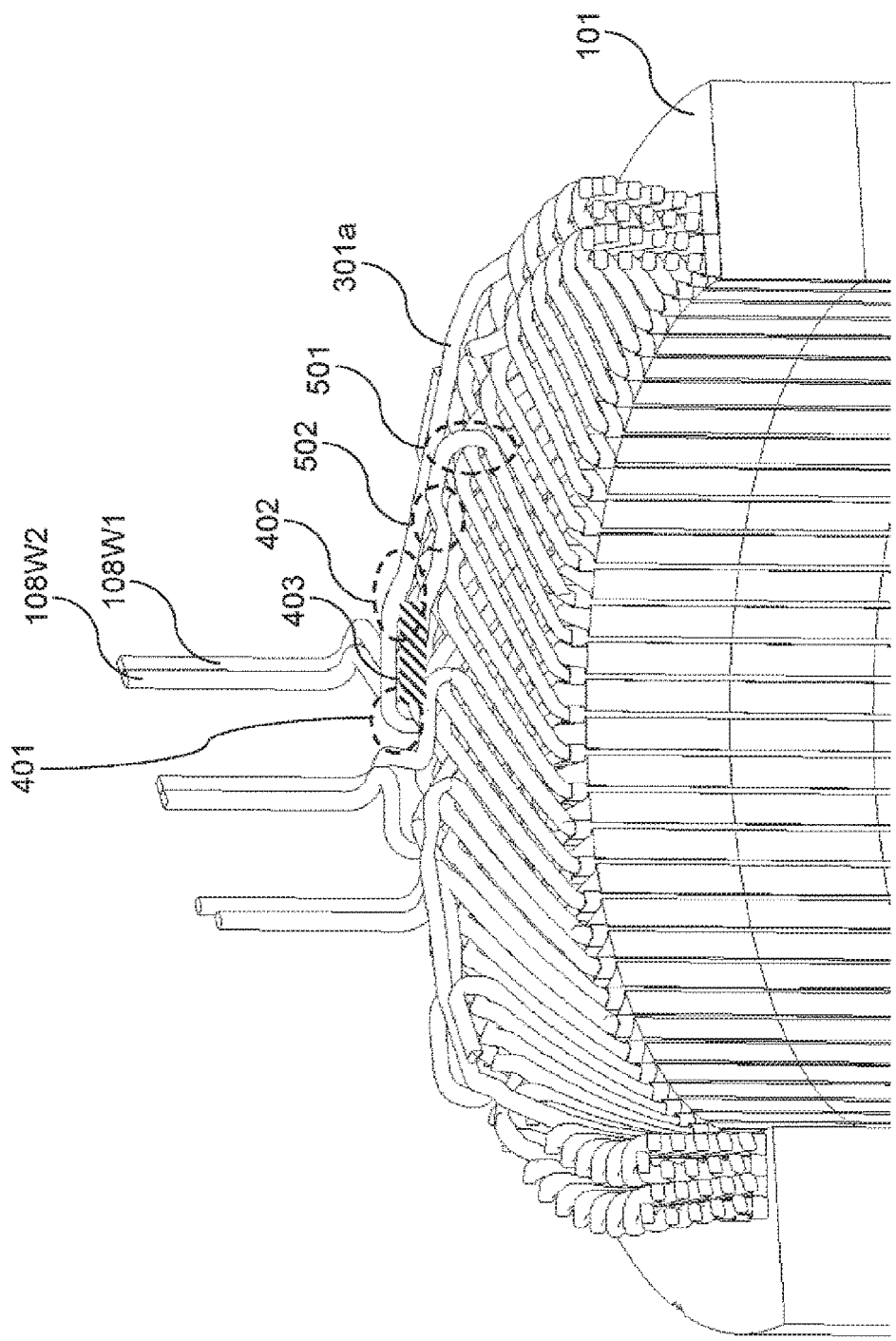
FIG. 8 illustrates crawling of neutral lines and output lines.

FIG. 8 illustrates crawling configuration of the neutral lines and the output lines.

A 4-phase output line 108W2 is made to slip through a space 403 generated under the acute-angle axially-folded and bent portion 401 provided in the neutral line 301, and the axially-bent stepped portion 402 provided in the vicinity of the acute-angle bent portion. At this time, it is the feature of the W-phase output line 108W2 that, as in the neutral line 300, an acute-angle bent portion 501 is provided and an axially-bent stepped portion 502 is provided nearby. With the aforementioned structure, the neutral lines can restrict the movement of the output lines during assembly, and allow easy positioning without requiring fixing with thread or the like.

In the crawling of the neutral lines and the output lines in the stator of the electric rotating machine for vehicle, the stepped portion is provided axially in the acute-angle folded portion, and the output line is slipped under the neutral line. The interference of the crawling coil can be avoided at the upper portion of the no-connection portion of the U-shaped or V-shaped segment coil, and the low coil end is achieved. In addition, the stator structure of the electric rotating machine having a feature that the thread or the like is unnecessary for fixing because of the sandwiching structure of the neutral lines sandwiching the output line.

The present invention is not limited to the aforementioned embodiment, and may include various modifications. For example, the embodiment has been described in detail to facilitate the understanding of the present invention, and is not necessarily limited to the embodiment that includes all of the aforementioned structure. Other structure may be added to, deleted from, or replaced by a part of the aforementioned embodiment.

REFERENCE SIGNS LIST 1 vehicle
2 engine
3 electric rotating machine
4 transmission
5 differential gear
6 wheel
7 case
100 stator
101 stator core
102 conductor
103 insulating paper
104 welding portion of conductor
105 slot
106a to 106d conductor portion of winding
107 U-shaped or V-shaped conductor lead-out portion
108U1, U2, V1, V2, W1, W2 output line portion for each phase
109 slit portion provided in slot
110 linear portion of conductor in slot
111 inclined line portion of conductor led out from slot
200 rotor
201 shaft
202A, 202B bearing
300 neutral line portion
301 neutral line 1
302 neutral line 2
303 connection portions of neutral lines
401 acute-angle folded and bent portion of neutral lines in lead-out direction of neutral line
402 axially-bent stepped portion of neutral line
403 space formed by axial bent portion of neutral line
403a to 403c crank portion 501 acute-angle folded and bent portion in a lead-out direction of output line
502 axially-bent stepped portion of output line

The invention claimed is:
1. A stator of an electric rotating machine, comprising:
a stator core having a slot; and
a stator winding including a first neutral line and an output line, which consists of 3 phases of U-phase, V-phase, and W-phase, wherein
the stator winding is inserted in the slot and wound around the stator core,
the first neutral line has a crawling portion that extends in a circumferential direction at an upper portion of a coil at a coil end,
the crawling portion has an axial stepped portion,
the first neutral line has an acute-angle axially-folded and bent portion and an axially-bent stepped portion, and
the output line which is led out from an innermost row of the slot passes under the first neutral line through a space formed: i) under the axially-bent stepped portion, and ii) by the first neutral line at a location thereof that is between the acute-angle axially-folded and bent portion and the axially-bent stepped portion.
2. The stator of the electric rotating machine according to claim 1, wherein
the output line passes under the first neutral line in the axial direction, whereby the output line is tacked without being fixed with thread or the like.
3. The stator of the electric rotating machine according to claim 1, further comprising:
first and second slots into which the first neutral line is inserted and a third slot into which a second neutral line is inserted are arranged circumferentially in the first slot, the third slot, and the second slot in this order.
4. The stator of the electric rotating machine according to claim 3, wherein
the first, second, and third slots are arranged at equal slot pitches.
5. The stator of the electric rotating machine according to claim 4, wherein
a connection portion of the first neutral line and a connection portion of the second neutral line are arranged side by side in the axial direction of a stator iron core.
6. The stator of the electric rotating machine according to claim 3, wherein
an insulating coating film is removed from connection portions of the first and second neutral lines.
7. The stator of the electric rotating machine according to claim 6, wherein
the connection portions of the first and second neutral lines connected with each other are covered by an insulating material.
8. An electric rotating machine comprising:
the stator of the electric rotating machine according to claim 1; and
a rotor.

* * * * *